(12) United States Patent
Ren et al.

(10) Patent No.: US 11,147,094 B2
(45) Date of Patent: Oct. 12, 2021

(54) COMMUNICATION METHOD AND COMMUNICATIONS APPARATUS AND SYSTEM

(71) Applicant: HUAWEI TECHNOLOGIES CO., LTD., Guangdong (CN)

(72) Inventors: Haibao Ren, Shanghai (CN); Yi Huang, Shenzhen (CN); Yuanjie Li, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 143 days.

(21) Appl. No.: 16/503,580

(22) Filed: Jul. 4, 2019

(65) Prior Publication Data

US 2019/0342905 A1 Nov. 7, 2019

Related U.S. Application Data

(63) Continuation of application No. PCT/CN2018/071621, filed on Jan. 5, 2018.

(30) Foreign Application Priority Data

Jan. 6, 2017 (CN) .......................... 201710010978.X

(51) Int. Cl.
*H04W 72/12* (2009.01)
*H04L 1/00* (2006.01)
(Continued)

(52) U.S. Cl.
CPC ......... *H04W 72/1273* (2013.01); *H04L 1/001* (2013.01); *H04L 1/0006* (2013.01); *H04L 5/0035* (2013.01); *H04W 24/02* (2013.01)

(58) Field of Classification Search
CPC . H04W 72/1273; H04W 24/02; H04W 72/12; H04L 1/0006; H04L 1/001;
(Continued)

(56) References Cited

U.S. PATENT DOCUMENTS 9,325,472 B2 4/2016 Kim et al.
2011/0317637 A1* 12/2011 Kim ...................... H04L 1/1819
370/329
(Continued)

FOREIGN PATENT DOCUMENTS

CN 102347919 A 2/2012
CN 102638851 A 8/2012
(Continued)

OTHER PUBLICATIONS

3GPP TS 36.212 V13.1.0 (Mar. 2016),3rd Generation Partnership Project;Technical Specification Group Radio Access Network;Evolved Universal Terrestrial Radio Access (E-UTRA);Multiplexing and channel coding(Release 13),total 129 pages.
(Continued)

*Primary Examiner* — Vinncelas Louis
(74) *Attorney, Agent, or Firm* — Womble Bond Dickinson (US) LLP

(57) ABSTRACT

A communication method comprises that a user equipment receives quantity information, sent by a transmission reception point TRP, of control information to be sent to the user equipment. N pieces of control information are to be sent to the user equipment, and N is an integer greater than or equal to 1. The user equipment determines, based on the quantity information, that the N pieces of control information need to be detected; and the user equipment detects the N pieces of control information. In an embodiment, processing complexity of the TRP and processing complexity of the user equipment can be reduced in a control information obtaining process.

21 Claims, 5 Drawing Sheets

(51) Int. Cl.
*H04L 5/00* (2006.01)
*H04W 24/02* (2009.01)

(58) Field of Classification Search
CPC ... H04L 5/0035; H04L 5/0091; H04L 5/0094; H04L 5/0053; H04L 1/1819; H04B 7/024
See application file for complete search history.

(56) References Cited

U.S. PATENT DOCUMENTS

| | | |
|---|---|---|
| 2012/0176884 A1 | 7/2012 | Zhang et al. |
| 2012/0201163 A1 | 8/2012 | Jöngren et al. |
| 2012/0269140 A1* | 10/2012 | Nam ............... H04B 7/024 370/329 |
| 2013/0178220 A1 | 7/2013 | Lee et al. |
| 2013/0301542 A1 | 11/2013 | Krishnamurthy et al. |
| 2013/0308479 A1 | 11/2013 | Schober et al. |
| 2014/0036804 A1 | 2/2014 | Chen et al. |
| 2014/0140316 A1 | 5/2014 | Nagata et al. |
| 2014/0192734 A1 | 7/2014 | Ng et al. |
| 2014/0313985 A1 | 10/2014 | Nimbalker et al. |
| 2017/0230994 A1 | 8/2017 | You et al. |

FOREIGN PATENT DOCUMENTS

| | | |
|---|---|---|
| CN | 103718599 A | 4/2014 |
| CN | 103947145 A | 7/2014 |
| CN | 104009820 A | 8/2014 |
| CN | 104919724 A | 9/2015 |
| CN | 105308878 A | 2/2016 |
| EP | 3557932 A1 | 10/2019 |
| EP | 3579482 A1 | 12/2019 |
| GN | 103312391 A | 9/2013 |
| JP | 2016506690 A | 3/2016 |
| WO | 2012/148170 A2 | 11/2012 |
| WO | 2013018639 A1 | 2/2013 |
| WO | 2018/141246 A1 | 8/2018 |

OTHER PUBLICATIONS

R1-124124 Fujitsu,"DCI format to support CoMP in TM10",3GPP TSG RAN WG1 #70 bis ,San Diego, USA, Oct. 8-12, 2012,total 4 pages.

R1-1610895 Huawei et al.,"WF on DL MIMO Transmission",3GPP TSG RAN WG1 Meeting #86bis,Lisbon, Portugal, Oct. 10-14, 2016,total 3 pages.

R1-164911 Panasonic,"Discussion on Single level DCI and two-level DCI",3GPP TSG RAN WG1 Meeting #85,Nanjing, China May 23-27, 2016,total 5 pages.

RP-160665 Intel Corporation et al.,"New SID: Further enhancements to Coordinated Multi-Point Operation",3GPP TSG RAN Meeting #71,Göteborg, Sweden, Mar. 7-10, 2016,total 7 pages.

* cited by examiner

COMMUNICATION METHOD AND COMMUNICATIONS APPARATUS AND SYSTEM

CROSS-REFERENCE TO RELATED APPLICATIONS

This application is a continuation of International Application No. PCT/CN2018/071621, filed on Jan. 5, 2018, which claims priority to Chinese Patent Application No. 201710010978.X, filed on Jan. 6, 2017. The disclosures of the aforementioned applications are hereby incorporated by reference in their entireties.

TECHNICAL FIELD

This application relates to the wireless communications technologies, and in particular, to a communication method and a communications apparatus and system.

BACKGROUND

To improve performance of a cell-edge user terminal (UE), improve cell-edge spectral efficiency, and optimize overall system performance of a plurality of cells, when the UE is located within a range covered by a plurality of base stations, the plurality of base stations may provide coordinated data transmission for the UE.

In the prior art, when a plurality of base stations provide coordinated data transmission for same UE, a serving base station of the UE sends control information to the UE. The control information includes scheduling information of the serving base station and scheduling information of other base stations providing coordinated transmission for the UE. The UE receives the control information delivered by the serving base station, and receives, based on the scheduling information that is of the base stations participating in coordinated transmission and that is included in the control information, data transmitted by the base stations. A format of the control information needs to be extended, so that the control information can indicate the scheduling information of the base stations participating in coordinated transmission. A quantity of base stations participating in coordinated transmission may be different each time. Therefore, a format of control information for indicating scheduling information of the base stations participating in coordinated transmission changes each time.

In the prior art, there is also a case in which UE is within a coverage area of a single base station and the UE and the base station performs single point transmission. When only one base station performs scheduling for the UE and transmits data to the UE, control information delivered by the base station to the UE does not need to be extended, and a format of the control information is different from a format of control information used when a plurality of base stations perform coordinated transmission.

Therefore, in the prior art, in different scenarios, formats of different control information need to be changed, the base station needs to generate control information in different formats, and the UE needs to process the control information in different formats. Consequently, processing performed by the base station and processing performed by the UE are excessively complex.

SUMMARY

This application provides a communication method and a communications apparatus and system, to reduce processing complexity of a transmission reception point and processing complexity of UE in coordinated transmission.

One aspect of embodiments of the present disclosure provides a communication method. In the method, a transmission reception point (TRP) determines quantity information of control information to be sent to same UE, and sends, to the UE, the determined quantity information of the control information to be sent to the UE, where N pieces of control information are to be sent to the UE, and N is an integer greater than or equal to 1.

Another aspect of the embodiments of the present disclosure provides a communication method. In the method, UE receives quantity information, sent by a TRP, of control information to be sent to the UE, the UE determines, based on the quantity information, that N pieces of control information need to be detected, and the UE detects the control information from N TRPs. A total of N pieces of control information are to be detected, and control information sent by each of the N TRPs is detected from the TRP.

In a possible implementation, the quantity information of the control information to be sent to the user equipment is included in a first transmission parameter set, and the control information is included in a second transmission parameter set. Alternatively, the quantity information of the control information to be sent to the user equipment is included in first-level downlink control information of a second transmission parameter set, and the control information is included in second-level downlink control information of the second transmission parameter set.

In a possible implementation, the quantity information of the control information to be sent to the UE may be determined based on a quantity of TRPs that need to send the control information to the UE. Alternatively, the quantity information of the control information to be sent to the UE may be configured as a fixed value, and the fixed value may be an integer greater than or equal to 1. A quantity of pieces of the control information to be sent to the UE is determined based on different cases, so that different scenario requirements can be flexibly met. The quantity of pieces of the control information may not exceed a threshold, so that transmission of excessive control information can be controlled, impact on system performance that is caused by occupation of excessive physical resources can be avoided, complexity of processing the excessive control information by the UE can be reduced, and energy consumption generated during the processing can be reduced. The quantity of pieces of the control information may be a quantity of second transmission parameter sets.

In a possible implementation, the TRP sending the control information to be sent to the same UE may be one of the N TRPs. Alternatively, the TRP sending the control information to be sent to the same UE may not belong to the N TRPs.

In a possible implementation, the quantity information of the control information to be sent to the user equipment is included in a first transmission parameter set, the first transmission parameter set may further include resource information for transmitting a second transmission parameter set, and the resource information indicates a candidate resource for transmitting the second transmission parameter set, so that the UE flexibly and quickly detects the second transmission parameter set.

In a possible implementation, N may be equal to 1, or N may be greater than or equal to 2. When N is 1, single point transmission may be implemented. When N is greater than or equal to 2, multipoint transmission may be implemented, and therefore transmission efficiency is improved.

In a possible implementation, when N is greater than or equal to 2, the N pieces of control information to be sent to the UE may have same content, or may have different content.

In a possible implementation, when the quantity information of the control information to be sent to the user equipment is included in the first transmission parameter set, the first transmission parameter set may further include content indication information of second transmission parameter sets, and the content indication information of second transmission parameter sets indicates whether the N second transmission parameter sets to be sent to the UE are the same. Alternatively, when the quantity information of the control information to be sent to the user equipment is included in the first-level downlink control information of the second transmission parameter set, the first-level downlink control information of the second transmission parameter set may further include control information content indication information, and the control information content indication information indicates whether the N pieces of control information to be sent to the UE are the same.

In a possible implementation, the UE detects at least two second transmission parameter sets or at least two pieces of control information, where the at least two second transmission parameter sets or the at least two pieces of control information have same content. The UE may combine a plurality of detected second transmission parameter sets or a plurality of pieces of detected control information, to improve reliability of sending the second transmission parameter sets or the control information.

In a possible implementation, the UE detects at least two second transmission parameter sets or at least two pieces of control information, where the at least two second transmission parameter sets or the at least two pieces of control information have different content. The at least two second transmission parameter sets or the at least two pieces of control information having different content may be used to schedule at least two different data channels, and the UE may separately send uplink data and receive downlink data on the N data channels. Therefore, non-coherent joint transmission can be implemented. Data transmitted on different data channels may be the same, and therefore, a data transmission reliability can be further improved. Data transmitted on different data channels may be different, and therefore, a system capacity can be further improved.

In a possible implementation, during multipoint transmission, data transmission between different TRPs and same UE may be performed on a same carrier, or may be performed on different carriers. Data that is independently precoded may be the same, and therefore, data transmission reliability can be improved. Alternatively, data that is independently precoded may be different, and therefore, a data transmission capacity of an entire system can be improved.

In a possible implementation, the quantity information of the to-be-transmitted control information may uniformly indicate a transmission mode, and the UE may determine the transmission mode based on the quantity information of the to-be-transmitted control information. The transmission mode and a channel-state-information measurement configuration parameter may be decoupled. The TRP may separately send the channel-state-information measurement configuration parameter to the UE. In this way, channel-state-information measurement and feedback accuracy can be improved, communication can effectively adapt to an actual channel change, and communication efficiency is improved.

In a possible implementation, the second transmission parameter set includes a parameter indicated by using a physical downlink control channel.

In a possible implementation, the quantity of pieces of the control information to be sent to the UE is a quantity of physical layer codewords that need to be received or sent, or may be a quantity of beams on which uplink communication is performed simultaneously.

In a possible implementation, when the quantity information of the control information to be sent to the user equipment is included in the first-level downlink control information of the second transmission parameter set, the TRP may further send the first transmission parameter set to the UE.

In a possible implementation, the first transmission parameter set further includes antenna port grouping information.

In a possible implementation, the first transmission parameter set further includes rank information, and the rank information may be rank information indicating data scheduled by using the second transmission parameter set.

In a possible implementation, the first transmission parameter set may further include layer mapping information, and the layer mapping information is used to predefine a codeword to layer mapping relationship.

In a possible implementation, for uplink scheduling, the second transmission parameter set may further include at least one of subband precoding information and power control information.

In a possible implementation, the first transmission parameter set further includes quasi co-location parameter configuration information of an antenna port of a channel that carries the second transmission parameter set, or may further include quasi co-location parameter configuration information of an antenna port of a data channel scheduled by using the second transmission parameter set. When the antenna port for sending the second parameter set and the antenna port for sending the data channel scheduled by using the second parameter set are different or do not meet a quasi co-location requirement, the quasi co-location parameter configuration information may include the quasi co-location parameter configuration information of the antenna port for sending the second parameter set and the quasi co-location parameter configuration information of the antenna port for sending the data channel scheduled by using the second parameter set, and the two types of quasi co-location parameter configuration information are different.

In a possible implementation, the first transmission parameter set further includes quasi co-location parameter indication information.

In a possible implementation, when the quantity information of the control information to be sent to the user equipment is included in the first-level downlink control information of the second transmission parameter set, the first-level downlink control information of the second transmission parameter set may further include the quasi co-location parameter indication information.

In a possible implementation, when the quantity information of the control information to be sent to the user equipment is included in the first-level downlink control information of the second transmission parameter set, the first-level downlink control information of the second transmission parameter set further includes rank information, and the rank information may be rank information indicating data scheduled by using the control information.

In a possible implementation, the first transmission parameter set further includes beam information, and the beam information indicates a transmit beam of the second transmission parameter set, or indicates a receive beam of the second transmission parameter set, or may indicate a transmit beam and a receive beam of the second transmission parameter set.

In a possible implementation, when the quantity information of the control information to be sent to the user equipment is included in the first-level downlink control information of the second transmission parameter set, the first-level downlink control information of the second transmission parameter set further includes beam information, and the beam information indicates a transmit beam of the second-level downlink control information of the second transmission parameter set, or a receive beam of the second-level downlink control information of the second transmission parameter set, or a transmit beam and a receive beam of the second-level downlink control information of the second transmission parameter set.

In a possible implementation, the first transmission parameter set is sent by using a radio resource control message, so that a control channel resource can be saved. In addition, the first transmission parameter set can be sent by using a relatively low modulation order at a relatively low encoding rate, to ensure transmission reliability.

In a possible implementation, the first transmission parameter set is sent by using a Medium Access Control control element, or the first transmission parameter set is sent by using downlink control information in a complete format; or the first transmission parameter set is sent by using the first-level downlink control information, the second transmission parameter set is sent by using the second-level downlink control information, and the first-level downlink control information and the second-level downlink control information form downlink control information in a complete format. In this way, configuration information of a control channel can be quickly sent to the UE, and can be quickly updated, so that an actual physical channel can be better matched.

According to another aspect, an embodiment of the present disclosure provides UE. The UE has a function of implementing behavior of the UE in the foregoing method implementations. The function may be implemented by using hardware, or may be implemented by executing corresponding software by hardware. The hardware or the software includes one or more modules corresponding to the foregoing function.

In a possible implementation, a structure of the UE includes a transceiver and a processor. The transceiver is configured to implement a corresponding receiving function and a notification function or a sending function in the foregoing method. For example, the transceiver may be configured to: receive quantity information, sent by a TRP, of control information to be sent to the user equipment, for example, receive a first transmission parameter set that includes the quantity information of the control information to be sent to the user equipment or first-level downlink control information that is of a second transmission parameter set and that includes the quantity information of the control information to be sent to the user equipment. The transceiver may be further configured to receive second transmission parameter sets sent by N TRPs. Further, the transceiver may receive downlink data sent by a plurality of TRPs on different data channels in multipoint transmission, or send uplink data to a plurality of TRPs. The processor may be configured to: determine, based on the quantity information, that N second transmission parameter sets need to be detected, and detect the control information from the N TRPs. The processor may be configured to: when at least two second transmission parameters or at least two pieces of control information have same content, combine the detected N pieces of second transmission parameter set control information; or configured to: when at least two pieces of second transmission parameter control information have different content, obtain scheduling information of N data channels based on the detected N pieces of second transmission parameter set control information. The UE may further include a memory. The memory is configured to: be coupled to the processor, and store a program instruction and data that are necessary for the UE.

In a possible implementation, a structure of the UE may include a transceiver unit and a processing unit. The transceiver unit may be configured to receive quantity information, sent by a TRP, of to-be-sent control information, may further receive control information sent by at least one TRP, and may further receive downlink data sent by the at least one TRP, or send uplink data to the at least one TRP. The processing unit may be configured to: determine, based on the quantity information of the to-be-sent control information, a quantity of pieces of control information that need to be received, and detect a corresponding determined quantity of pieces of control information.

According to still another aspect, an embodiment of the present disclosure provides a TRP. The TRP has a function of implementing behavior of the TRP in the foregoing method implementations. The function may be implemented by using hardware, or may be implemented by executing corresponding software by hardware. The hardware or the software includes one or more modules corresponding to the foregoing function. The modules may be software and/or hardware.

In a possible implementation, a structure of the TRP includes a transceiver and a processor. The processor may be configured to: determine quantity information of control information to be sent to the UE, and send a first transmission parameter set to the UE. The transceiver may be configured to send, to the UE, the determined quantity information of the control information to be sent to the UE. The transceiver may further send a second transmission parameter set to the UE. The TRP may further include a memory. The memory is configured to: be coupled to the processor, and store a program instruction and data that are necessary for the TRP.

In a possible implementation, the TRP may include a processing unit and a transceiver unit. The processing unit may be configured to determine quantity information of to-be-sent control information. The transceiver unit may be configured to send the quantity information of the to-be-sent control information to UE, and may send the control information to the UE. Further, the transceiver unit may further send downlink data to the UE, and receive uplink data sent by the UE.

According to still another aspect, an embodiment of the present disclosure provides a communications system. The system includes the at least one TRP according to the foregoing aspects.

According to still another aspect, an embodiment of the present disclosure provides a communications system. The system includes the UE according to the foregoing aspects.

According to still another aspect, an embodiment of the present disclosure provides a communications system. The system includes the at least one TRP and the UE according to the foregoing aspects.

According to still another aspect, an embodiment of the present disclosure provides a computer storage medium, configured to store a computer software instruction used by the foregoing UE. The computer software instruction includes a program for performing the foregoing aspects.

According to still another aspect, an embodiment of the present disclosure provides a computer storage medium, configured to store a computer software instruction used by the foregoing TRP. The computer software instruction includes a program for performing the foregoing aspects.

According to the technical solutions provided in the embodiments of the present disclosure, and according to the method provided in the embodiments of the present disclosure, the TRP can use downlink control information in a same format in both single point transmission and multipoint transmission, there is no need to extend the downlink control information, and there is no need to frequently change the format of the downlink control information either. Therefore, both the TRP and the UE can easily implement different transmission, and backward compatibility with single connection transmission of the UE can be well implemented.

DESCRIPTION OF EMBODIMENTS

Figure 1:
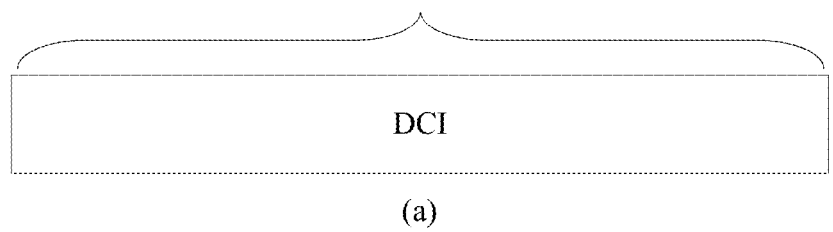
FIG. 1 is a schematic diagram of a downlink control information format according to an embodiment of the present disclosure.
Figure 1:
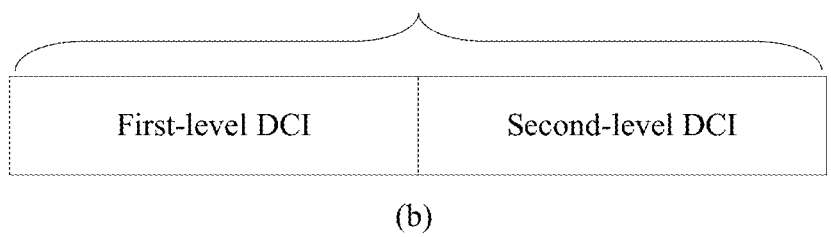
Figure 1:
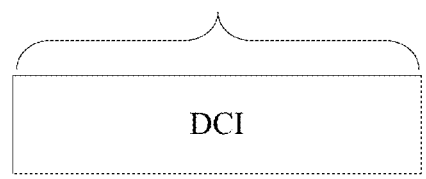

The following describes the embodiments of the present disclosure with reference to the accompanying drawings.

To achieve the objectives of the present disclosure and other objectives described in an embodiment, this embodiment of the present disclosure provides a communications system. In the communications system, there may be at least one transmission reception point (TRP) on a network side, and there may be at least one UE on a terminal side. The TRP may be a device on an access network side, for example, a base station BS, a relay node, or an access point (AP), configured to support the UE in accessing a system. The base station may be a macro base station, a micro base station, a home eNodeB, or the like. The TRP may be fixed or mobile. In this embodiment of the present disclosure, the UE may be referred to as a terminal, a mobile station, a subscriber unit, a station, or the like. The UE may be a cellular phone, a personal digital assistant (PDA), a wireless modem, a wireless communications device, a handheld device, a laptop computer, a cordless phone, a wireless local loop (WLL) station, a tablet computer (pad), or the like. As an Internet of Things technology develops, a device, such as a terminal and a car in intelligent transportation, a smart household device, a terminal in a smart grid, an electric power meter reading instrument, a voltage monitoring instrument, an environment monitoring instrument, a video surveillance instrument in a smart security network, or a cash register, that can access a wireless communications network, communicate with a wireless network system side, or communicate with another object by using a wireless network may be the UE in this embodiment of the present disclosure. In this embodiment of the present disclosure, the UE may communicate with the TRP. The UE may be static or mobile.

In the communications system provided in this embodiment of the present disclosure, the TRP may send a transmission parameter to the at least one UE. The transmission parameter may include at least two transmission parameter sets, for example, a transmission parameter set 1 and a transmission parameter set 2. The transmission parameter set 1 may also be referred to as a first transmission parameter set, and the transmission parameter set 2 may also be referred to as a second transmission parameter set. In this embodiment of the present disclosure, based on a requirement, a particular parameter may be included in the first transmission parameter set, or may be included in the second transmission parameter set. A name of the transmission parameter set imposes no limitation on a parameter. The first transmission parameter set and the second transmission parameter set may be carried on channels of a same type for transmission, or may be carried on channels of different types for transmission, or may be carried on channels of a same type that have different formats for transmission. The first transmission parameter set and the second transmission parameter set may be transmitted as a whole. When the first transmission parameter set and the second transmission parameter set are transmitted as a whole, it may be considered that transmission parameters in different sets are carried in one message or one information element for sending. The different transmission parameter sets may be separately sent, for example, sent in different messages or different information.

The first transmission parameter set may include a parameter defined by a layer 1, a layer 2, or a layer 3. The layer 1 is usually a physical layer. The layer 2 is usually a Medium Access Control (MAC) layer. The layer 3 is usually a radio resource control (RRC) layer. In a default transmission scheme, a default value may be specified for the parameter in the first transmission parameter set. Parameters in the first transmission parameter set may be sent by using a same message or a plurality of different messages at a same layer, or may be carried in different messages at different layers for sending.

The second transmission parameter set includes a parameter indicated by using the physical layer, for example, a parameter indicated by using a physical downlink control channel. The second transmission parameter set may be downlink control information (DCI). In this embodiment, the DCI may be DCI in a complete DCI format, namely, a single piece of complete DCI or one-level DCI. For example, the DCI may be carried on a physical downlink control channel (PDCCH) with a DCI format. In this embodiment, for the DCI in a complete DCI format, a person skilled in the art may refer to a same or similar DCI format in an existing LTE standard protocol and an LTE system. Alternatively, according to a new definition, downlink control information with different functions may be carried on the PDCCH, and the downlink control information forms the DCI in a complete DCI format. In one embodiment, DCI in a two-level or multi-level format is provided in this embodiment of the present disclosure. As shown in FIG. 1, the DCI in a complete DCI format may alternatively be divided into two or more parts. The different parts may also be referred to as different sublevel DCI. To be specific, the DCI in a complete DCI format may be divided into two or more pieces of sublevel DCI. In other words, in this embodiment, the DCI may be in a form of two-level or multi-level DCI, and the two-level or multi-level DCI may form the DCI in a complete DCI format. For example, this embodiment provides two-level DCI, including first-level DCI and second-level DCI. The first-level DCI includes broadband information, or may include control information corresponding to common information such as system broadcast information or random access information, or include transmission policy indication information, or include carrier indication information, or include scheduling information of a common part of different transmission policies, or the like. The second-level DCI may be used to indicate some or all of resource allocation information, modulation and coding scheme information, subband-level precoding matrix indication information, and the like. If the DCI is the two-level DCI, the second transmission parameter set may be the second-level DCI. When the second transmission parameter set is the second-level DCI, the first transmission parameter set may be the first-level DCI, or partial content of the first transmission parameter set includes the first-level DCI. Alternatively, the second transmission parameter set may be DCI in a complete format that includes multi-level DCI. For example, the second transmission parameter set includes first-level DCI and second-level DCI. The first-level DCI may be carried by a PDCCH, and the second-level DCI may be carried by a same PDCCH or different PDCCHs, or may be carried by a physical downlink shared channel (PDSCH). In one embodiment, in this embodiment of the present disclosure, there may be at least two pieces of DCI in different DCI formats, and each piece of DCI has a complete DCI format, and is carried by one PDCCH corresponding to the DCI format. FIG. 1(a) shows DCI in a complete DCI format. The DCI is carried by a PDCCH with the DCI format. FIG. 1(b) shows an example of two-level DCI. The first-level DCI and second-level DCI may form, for example, one piece of DCI in a complete DCI format shown in FIG. 1(a). FIG. 1(c) shows two types of DCI in different DCI formats. The two types of DCI may be separately carried by PDCCHs with the corresponding different formats. The two types of DCI in different formats may be different from DCI in a format in an existing system. Certainly, the two types of DCI in different formats may alternatively be the same as the DCI in a format in the existing system. It may be understood that each type of DCI shown in FIG. 1 is merely an illustrative example for ease of understanding, and imposes no substantial limitation on the DCI in this embodiment.

In one embodiment, the second transmission parameter set depends on a parameter setting of the first transmission parameter set, and a size of the second transmission parameter set, for example, a DCI size, may be changed.

In this embodiment, DCI in a complete format, hierarchical DCI, and DCI in a plurality of different formats each may be carried by a PDCCH with a particular DCI format. The DCI in a complete DCI format may be carried by a PDCCH with the DCI format. If the DCI is two-level or multi-level DCI, the two-level or multi-level DCI may be carried by a plurality of PDCCHs, or carried by one PDCCH. The DCI in different formats is separately carried by PDCCHs with the different DCI formats. In one embodiment, the second transmission parameter set may be transmitted through a PDCCH with a format of the second transmission parameter set. The second transmission parameter set may also be understood as a set of parameters carried by the PDCCH. Sending the second transmission parameter set by the TRP may also be referred to as sending the PDCCH. Detecting or receiving the second transmission parameter set by the UE may also be referred to as detecting or receiving the DCI by the UE, or referred to as detecting or receiving, by the UE, the PDCCH with the DCI format or the PDCCH with the format of the second transmission parameter set.

Figure 2A:
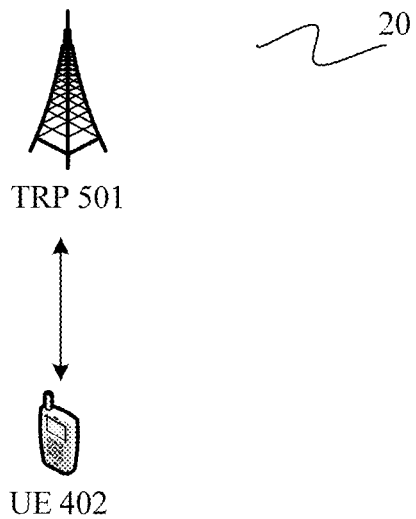
FIG. 2A is a schematic diagram of a communications system according to an embodiment of the present disclosure.
Figure 2B:
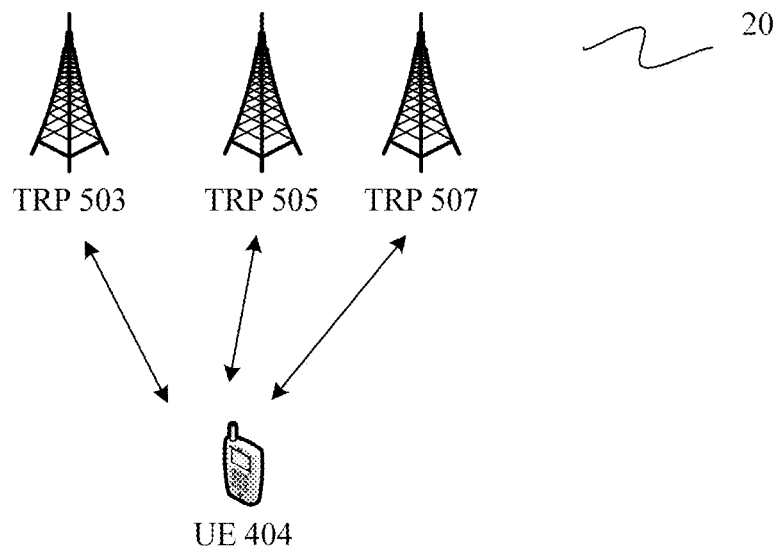
FIG. 2B is a schematic diagram of another communications system according to an embodiment of the present disclosure.

For example, a communications system 20 shown in FIG. 2A and FIG. 2B includes at least one UE 40 and at least one TRP 50, the UE 40 may include UE 402, UE 404, or the like, and the TRP 50 may include a TRP 501, a TRP 503, a TRP 505, or the like. In this embodiment of the present disclosure, the UE communicates with a network side. As shown in FIG. 2A, the UE 402 may receive a second transmission parameter set sent by one TRP, for example, the TRP 501. The UE communicates with the TRP 501, and the TRP 501 transmits data to the UE 402. The TRP 501 is a serving TRP of the UE 402. In an implementation shown in FIG. 2A, the UE communicates with the network side by using one TRP. This case may be referred to as centralized transmission, or single point transmission, or single-TRP transmission, or non-multipoint transmission. In one embodiment, as shown in FIG. 2B, the UE 404 is covered by at least two TRPs. The UE 404 may receive second transmission parameter sets separately sent by the at least two TRPs, for example, the TRP 503 and the TRP 505, to the UE 404. The UE 404 is scheduled to perform data transmission with the TRP 503 and the TRP 505, and the data transmission includes at least one of uplink data sending and downlink data receiving. In an implementation shown in FIG. 2B, the UE communicates with the network side by using the at least two TRPs. This case may be referred to as distributed transmission, or multipoint joint transmission, or multi-TRP transmission, or coordinated multipoint transmission/reception. The TRP 503 and the TRP 505 are mutually coordinating TRPs. The TRP 505 may be a serving TRP of the UE. The serving TRP may be a TRP providing a service such as radio resource control (RRC) connection, non-access stratum (NAS) mobility management, or security input for the UE according to a wireless air interface protocol. The coordinating TRP and the serving TRP may separately schedule data, separately indicate respective scheduling result information by using the second transmission parameter sets, and send the data and the scheduling result information to the UE. In this embodiment of the present disclosure, more TRPs may transmit second transmission parameter sets to the same UE. Different TRPs may also transmit second transmission parameter sets to different UEs. Therefore, this is not limited to the example cases shown in FIG. 2A and FIG. 2B.

In this embodiment of the present disclosure, the TRP may send quantity information of to-be-sent control information to the UE, where N pieces of control information are to be sent to the UE, and N is an integer greater than or equal to 1; the user equipment determines, based on the quantity information, that the N pieces of control information need to be detected; and the user equipment detects the control information from N TRPs. The quantity information of the to-be-sent control information may be sent by using a first transmission parameter set, and the control information is sent by using a second transmission parameter set. In this embodiment, when the second transmission parameter set is two-level DCI, the TRP may also send the quantity information of the to-be-sent control information to the UE in first-level DCI of the second transmission parameter set. In other words, the first-level DCI of the transmission parameter set may include the quantity information of the to-be-sent control information, and the control information may be sent by using second-level DCI of the second transmission parameter set. The TRP sends the quantity information of the to-be-transmitted control information to the UE. After obtaining the quantity information, the UE can determine a quantity of pieces of control information that need to be detected, and detect a corresponding quantity of pieces of control information. The at least one TRP can use downlink control information in a same format in both the single point transmission and the coordinated multipoint transmission/reception, there is no need to extend the downlink control information, and there is no need to frequently change the format of the downlink control information in different transmission either. Therefore, both the TRP and the UE can easily implement different transmission.

In this embodiment of the present disclosure, the TRP may send the quantity information of the to-be-sent control information to the UE. In other words, the TRP may send the quantity information of the to-be-sent control information to the UE.

In this embodiment of the present disclosure, the control information may alternatively be control information sent by the TRP to the UE. For example, the control information may include information used to control and schedule any one of uplink transmission, downlink transmission, data transmission, or the like. In one embodiment, the control information may also be referred to as control information sent on a downlink or downlink control information. The control information is sent by using the second transmission parameter set. For example, the control information may be transmitted through a PDCCH with a format of the second transmission parameter set format. Alternatively, the control information is sent by using the second-level DCI of the second transmission parameter set. For example, the control information may be transmitted through a PDCCH with a format of the second-level DCI or transmitted through a PDSCH.

In this embodiment of the present disclosure, the TRP may send a first transmission parameter set to the UE. The first transmission parameter set includes quantity information of a to-be-sent second transmission parameter set. At least one TRP may send a second transmission parameter set to the same UE. The TRP sending the first transmission parameter set may be one of the at least one TRP sending the second transmission parameter set. In other words, the TRP sending the first transmission parameter set participates in sending the second transmission parameter set. Alternatively, the TRP sending the first transmission parameter set may not be one of the at least one TRP. In other words, the TRP sending the first transmission parameter set does not participate in sending the second transmission parameter set. The UE may receive the quantity information, sent by the TRP, of the to-be-sent second transmission parameter set, and then detect second transmission parameter sets whose quantity corresponds to the quantity information. The second transmission parameter set may be sent by the at least one TRP. For example, in the single point transmission used as an example shown in FIG. 2A, the TRP 501 may send, to the UE 402, quantity information of a second transmission parameter set to be sent to the UE 402. For example, the quantity information is 1. The TRP 501 sends a second transmission parameter set to the UE 402. In the coordinated multipoint transmission/reception shown in FIG. 2B, the TRP 503, the TRP 505, or the TRP 507 may send, to the UE 404, quantity information of a second transmission parameter set to be sent to the UE 404. For example, the quantity information is 3. In this case, the TRP 503, the TRP 505, and the TRP 507 each send a second transmission parameter set to the UE 404. After receiving the quantity information, the UE 404 determines that three second transmission parameter sets need to be detected, and then detects the second transmission parameter sets separately sent by the TRP 503, the TRP 505, and the TRP 507. Alternatively, in the example shown in FIG. 2B, the TRP sending the first transmission parameter set does not participate in sending the second transmission parameter set. For example, the TRP 503 sends, to the UE 404, quantity information of a second transmission parameter set to be sent to the UE 404. The quantity information is at least 1. For example, the quantity information is 2. In this case, the TRP 505 and the TRP 507 each send a second transmission parameter set to the UE 404. After receiving the quantity information, the UE 404 determines that two second transmission parameter sets need to be detected, and then detects the second transmission parameter sets separately sent by the TRP 505 and the TRP 507.

In this embodiment, the TRP sends the quantity information of the to-be-transmitted second transmission parameter set to the UE; after obtaining the quantity information, the UE can determine a quantity of second transmission parameter sets that need to be detected, and detect a corresponding quantity of second transmission parameter sets. The at least one TRP can use second transmission parameter sets in a same format in both the single point transmission and the coordinated multipoint transmission/reception, there is no need to extend the second transmission parameter sets, and there is no need to frequently change the format of the second transmission parameter sets in different transmission either. Therefore, both the TRP and the UE can easily implement different transmission.

Various existing wireless communications systems may also be configured to: use the solution in this embodiment of the present disclosure in which at least one TRP may send quantity information of a to-be-sent second transmission parameter set to same UE, and at least one TRP may send a second transmission parameter set to the same UE; and use other described solutions provided in all the embodiments. These systems include but are not limited to, for example, a Code Division Multiple Access (CDMA) system, a Time Division Multiple Access (TDMA) system, a Frequency Division Multiple Access (FDMA) system, an orthogonal frequency division multiple access (OFDMA) system, a single carrier frequency division multiple access (single carrier FDMA, SC-FDMA) system, and other networks. Terms "network" and "system" in this embodiment of the present disclosure may be interchanged. A CDMA network can implement wireless technologies such as Universal Terrestrial Radio Access (UTRA) and CDMA2000. The UTRA may include CDMA (WCDMA) and another variant of the CDMA. The CDMA2000 may include an interim standard (IS) 2000 (IS-2000), an IS-95 standard, and an IS-856 standard. A TDMA network can implement a wireless technology such as Global System for Mobile Communications (GSM). An OFDMA network can implement wireless technologies such as evolved universal terrestrial radio access (evolved UTRA, E-UTRA), Ultra Mobile Broadband (UMB), IEEE 802.11 (Wi-Fi), IEEE 802.16 (WiMAX), IEEE 802.20, and Flash OFDMA. The UTRA and the E-UTRA are UMTS and evolved UMTS. In 3GPP, the new UMTS release of the E-UTRA is used in Long Term Evolution (LTE) and LTE Advanced (LTE-A). The UTRA, the E-UTRA, the UMTS, the LTE, the LTE-A, and the GSM are recorded and described in a document of the 3GPP standards organization. The CDMA2000 and the UMB are recorded and described in a document of the 3GPP2 standards organization.

In a subsequent evolved system of an LTE system, or a new radio access technology system (which may be referred to as an "NR" system), or a 5G system or any next-generation system developed by the standards organization, a TRP may send quantity information of a to-be-sent second transmission parameter set to same UE, and at least one TRP may send a second transmission parameter set to the same UE. All technical solutions provided in the embodiments of the present disclosure may be applied to these systems.

In this embodiment of the present disclosure, the first parameter set sent by the TRP to the UE may include the quantity information of the second transmission parameter set to be sent to the UE. The quantity information of the second transmission parameter set to be sent to the UE is used to indicate, to the UE, the quantity of second transmission parameter sets to be sent to the UE. The UE receives the quantity information of the second transmission parameter set to be sent to the UE, and the UE may determine, based on the quantity information, the quantity of second transmission parameter sets that need to be received. In one embodiment, the quantity information of the to-be-transmitted second transmission parameter set may uniformly indicate a transmission mode. In other words, different quantity information of to-be-transmitted second transmission parameter sets may indicate different transmission modes. For example, when the quantity information of the to-be-transmitted second transmission parameter set indicates that a quantity is 1, single point transmission mode, namely, a centralized transmission mode or a non-coordinated transmission mode, may be indicated. When the quantity information of the to-be-transmitted second transmission parameter set indicates that a quantity is greater than or equal to 2, a coordinated multipoint transmission/reception mode, namely, a distributed transmission mode or a joint transmission mode, may be indicated. The UE may determine a current transmission mode based on the quantity information of the to-be-transmitted second transmission parameter set.

In one embodiment, the quantity information of the second transmission parameter set to be sent to the UE may be determined based on a quantity of TRPs that need to send second transmission parameter sets to the UE. For example, when only one TRP needs to send second transmission parameter set to the UE, the quantity of second transmission parameter sets may be configured as 1. Alternatively, when at least two TRPs each need to send a second transmission parameter set to the UE on a same carrier, the quantity of second transmission parameter sets may be corresponding to a quantity of TRPs. In this case, the quantity of second transmission parameter sets is greater than or equal to 2.

In one embodiment, the quantity information of the second transmission parameter set to be sent to the UE may be configured as a fixed value, and the fixed value may be an integer greater than or equal to 1. If the quantity of second transmission parameter sets to be sent to the UE is configured as the fixed value, the quantity information of the second transmission parameter set to be sent to the UE does not vary with the quantity of TRPs that need to send the second transmission parameter sets to the UE, and the UE may detect second parameter sets whose quantity is the fixed value.

In one embodiment, an upper limit may be set for the quantity of second transmission parameter sets. In other words, the quantity of second transmission parameter sets does not exceed a specified threshold. The threshold may be greater than or equal to 2. A value of the threshold may be determined based on overall system resource use. When the quantity of TRPs that need to send the second transmission parameter sets to the UE does not exceed the threshold, the quantity information may be determined based on an actual quantity of TRPs that need to send second transmission parameter sets to the UE on a same carrier. If the quantity of TRPs that need to send the second transmission parameter sets to the UE exceeds the threshold, the quantity of second transmission parameter sets is equal to the threshold. Transmission of excessive second transmission parameter sets can be controlled by setting the threshold for the quantity of second transmission parameter sets. In this way, impact on system performance that is caused by occupation of excessive physical resources is avoided, complexity of processing the excessive second transmission parameter sets by the UE can be reduced, and energy consumption generated during the processing can be reduced.

In this embodiment, the first transmission parameter set may further include resource information for transmitting a second transmission parameter set. The resource information indicates a candidate resource for transmitting the second transmission parameter set. The resource information may include information about a resource required by each of the at least one TRP that needs to transmit the second transmission parameter set. When a plurality of TRPs each need to transmit a second transmission parameter set, the resource information indicates a candidate resource for transmitting a second transmission parameter set by each TRP. The resource information may be, for example, sub-band information, a control channel resource, resource set information, quasi co-location (QCL) information, or the like that carries the second transmission parameter set. In one embodiment, when at least two TRPs need to transmit respective second transmission parameter sets, candidate resources may be on a same carrier, or may be on different carriers. In other words, the at least two TRPs may send the respective second transmission parameter sets to same UE on the same carrier or on the different carriers. In the coordinated multipoint transmission/reception, transmit antenna ports corresponding to the at least two TRPs providing coordinated multipoint transmission/reception for the same UE belong to different QCL groups and have different QCL parameters. Large-scale properties of channels from antenna ports of TRPs in different QCL groups to the UE are different. The large-scale property may be, for example, one or more of the following information about the channel: an average gain, delay spread, an average delay, a Doppler shift, Doppler spread, and a receive-side spatial characteristic (for example, an angle of arrival of a beam). It may be considered that antenna ports corresponding to TRPs with different geographic locations are non-QCL. It may be considered that antenna ports belonging to a same antenna port group meet a QCL condition. Different antenna ports are grouped based on corresponding QCL parameters, and the UE is instructed to perform corresponding differentiation, so that the UE side performs channel estimation and signal demodulation for the different antenna ports by using the corresponding QCL parameters, thereby improving channel estimation accuracy and demodulation performance on the UE side.

In this embodiment, if at least two TRPs need to send second transmission parameter sets to same UE, the second transmission parameter sets sent by the different TRPs may be the same or different. The first transmission parameter set may further include content indication information of second transmission parameter sets. The content indication information of second transmission parameter sets may indicate whether the second transmission parameter sets sent by the at least two TRPs to the same UE are the same or different.

In one embodiment, when the second transmission parameter sets that need to be separately sent by the at least two TRPs are different, the first transmission parameter set may further include antenna port grouping information. The antenna port grouping information may indicate information about an antenna port allowed to be used by a data channel. The data channel may be a physical downlink shared channel (PDSCH) or a physical uplink shared channel (PUSCH). The second transmission parameter sets may further share some demodulation reference signals (DMRS) with the PDSCH. In other words, the PDSCH and a physical downlink control channel may share some DMRSs. In this case, the some DMRSs shared with the PDSCH may be used to perform channel estimation and demodulation on the physical downlink control channel, to reduce pilot overheads caused when the DMRSs are separately sent to perform channel estimation and demodulation on the physical downlink control channel.

In one embodiment, the first transmission parameter set may further include QCL parameter configuration information corresponding to an antenna port group information. The QCL parameter configuration information may be used by the UE to determine a QCL parameter set that needs to be used when the UE receives or demodulates a channel. The QCL parameter set includes a QCL parameter set used to receive or demodulate at least one of a channel that carries the second parameter set and a data channel scheduled by using the second parameter set. For example, a plurality of groups of QCL parameters may be configured by using the QCL parameter configuration information. A value of each group of QCL parameters may be a channel large-scale parameter value corresponding to at least one of a channel state information-reference signal (CSI-RS), a phase-noise reference signal (PN-RS), a synchronization channel, a parameter (for example, an angle of arrival or receive beam information) representing a UE-side spatial correlation characteristic, and the like. For example, the QCL parameter configuration information may be at least one of a corresponding CSI-RS resource or ID, a corresponding PN-RS resource or ID, a corresponding synchronization channel resource or ID, a resource or an ID of the parameter (for example, the angle of arrival or the receive beam information) representing the UE-side spatial correlation characteristic, and the like.

In one embodiment, when an antenna port for sending the second parameter set and an antenna port for sending the data channel scheduled by using the second parameter set are different or do not meet a QCL requirement, the QCL parameter configuration information included in the first transmission parameter set needs to be separately configured for the antenna port for sending the second parameter set and the antenna port for sending the data channel scheduled by using the second parameter set. In other words, the QCL parameter configuration information may include QCL parameter configuration information of the antenna port for sending the second parameter set and QCL parameter configuration information of the antenna port for sending the data channel scheduled by using the second parameter set. The two types of QCL parameter configuration information are different.

In one embodiment, the first transmission parameter set may further include QCL parameter indication information corresponding to an antenna port group. The QCL parameter indication information, together with the QCL parameter configuration information, may be used to assist the UE in performing channel estimation and signal demodulation on at least one of the channel that carries the second parameter set and the data channel scheduled by using the second parameter set. For example, a plurality of groups of QCL parameter sets may be configured by using the QCL parameter configuration information, and the QCL parameter indication information may indicate a QCL parameter set corresponding to an antenna port that carries a particular channel or signal. The QCL parameter indication information indicates particular QCL parameter configuration information corresponding to each group of antenna ports of the channel that carries the second parameter set and/or the data channel scheduled by using the second parameter set.

When the QCL parameter configuration information included in the first transmission parameter set needs to be separately configured for the antenna port for sending the second parameter set and the antenna port for sending the data channel scheduled by using the second parameter set, correspondingly, the first transmission parameter set may include QCL parameter indication information of the antenna port for sending the second transmission parameter set and QCL parameter indication information of the antenna port used for the data channel scheduled by using the second transmission parameter set.

In this embodiment of the present disclosure, the first transmission parameter set may further include rank information. In one embodiment, the rank information in this embodiment of the present disclosure may be information indicating a rank for transmitting each physical layer codeword, or may be rank information indicating data scheduled by using the second transmission parameter set. In this embodiment, for two-level DCI, the second transmission parameter set is one piece of sublevel DCI, for example, second-level DCI, and the first transmission parameter set that includes the rank information may be first-level DCI. Different TRPs may send, according to a codeword to layer mapping rule by using different QCL antenna ports, respective second transmission parameter sets and corresponding data channels that are scheduled by using the second parameter sets.

In this embodiment of the present disclosure, the first transmission parameter set may further include layer mapping information, and the layer mapping information is used to predefine a codeword to layer mapping relationship.

In this embodiment of the present disclosure, the first transmission parameter set may further include beam information. The beam information may include transmit beam information, or receive beam information, or transmit and receive beam pair information. A beam may be understood as a space resource, and may be a transmit precoding vector and/or a receive precoding vector that have/has energy transmission directivity. The transmit precoding vector and/or the receive precoding vector can be identified by using index information. The energy transmission directivity may mean that a signal received on a particular spatial location and precoded by using the precoding vector has higher received power, for example, meets a demodulation signal-to-noise ratio of a receiver. The energy transmission directivity may also mean that a same signal sent on different spatial locations and received by using the precoding vector has different received power. A same device may have different precoding vectors. Different devices may also have different precoding vectors, in other words, correspond to different beams. Regarding a configuration or a capability of a communications device, one communications device may use one or more of a plurality of different precoding vectors at a same moment, in other words, one or more beams may be formed simultaneously. The beam information may be identified by using index information. The index information may correspond to a configured resource identifier (ID) of the UE, for example, correspond to a configured CSI-RS ID or resource, or may correspond to a configured uplink sounding reference signal (SRS) ID or resource, or may be index information explicitly or implicitly carried by a signal or a channel that is carried on the beam, including but not limited to index information that is of the beam and that is indicated by a synchronization signal or a broadcast channel sent on the beam.

In this embodiment of the present disclosure, one or more types of information in the foregoing described first transmission parameter set may be used for downlink scheduling, or may be used for downlink scheduling, or may be used for both uplink scheduling and downlink scheduling.

In one embodiment, in this embodiment of the present disclosure, the foregoing described antenna port grouping information, rank information, layer mapping information, resource allocation result information, and beam information may not be included in the first transmission parameter set, but included in the second transmission parameter set for sending. In one embodiment, the second transmission parameter set includes multi-level DCI, for example, two-level DCI. The foregoing described information may be included in first-level DCI of the second transmission parameter set. In one embodiment, when a control channel and the data channel do not share a DMRS, an antenna port of the control channel is different from the antenna port of the data channel. Antenna port grouping information, QCL parameter configuration information and QCL parameter indication information of the antenna port, and the like of the control channel are included in the first transmission parameter set, and antenna port grouping information, QCL parameter indication information of the antenna port, and the like of the data channel that are indicated by the control channel are included in the second transmission parameter set. In one embodiment, if the second transmission parameter set includes multi-level DCI, for example, two-level DCI, the antenna port grouping information, the QCL parameter indication information of the antenna port, and the like of the data channel that are indicated by the control channel may alternatively be included in first-level DCI of the second transmission parameter set.

For uplink scheduling, the second transmission parameter set may further include at least one of subband precoding information and power control information. In one embodiment, if the second transmission parameter set includes multi-level DCI, for example, two-level DCI, the subband precoding information may be included in second-level DCI of the second transmission parameter set, and the power control information may be included in first-level DCI or the second-level DCI of the second transmission parameter set.

In this embodiment, optionally, one second transmission parameter set may indicate resource allocation information and a modulation and coding scheme of one physical layer codeword. Correspondingly, the quantity of second transmission parameter sets may be equal to a quantity of physical layer codewords that need to be received by the UE. Different codewords are mapped to different layers, and sent through antenna ports indicated by the antenna port grouping information and belonging to different groups.

In one embodiment, when the second transmission parameter set is used to indicate uplink scheduling information, the quantity of second transmission parameter sets may be a quantity of beam sets on which uplink communication is performed simultaneously. In one embodiment, the quantity information of the second transmission parameter set corresponds to a quantity of scheduled uplink codewords of the UE. The second transmission parameter set may further include information indicating a first-level beam sent by the UE on an uplink, for example, at least one of a beam identifier obtained through measurement in an uplink beam scanning or precise detection process, a sounding reference signal (SRS) resource identifier, broadband information corresponding to a beam, and long-term precoding matrix indicator (PMI) information (for example, a first-level codebook W1 used in a two-level codebook structure).

In this embodiment of the present disclosure, the TRP may send the quantity information of the to-be-sent control information to the UE, where N pieces of control information are to be sent to the UE, and N is an integer greater than or equal to 1; the user equipment determines, based on the quantity information, that the N pieces of control information need to be detected; and the user equipment detects the control information from the N TRPs. In this embodiment, when the second transmission parameter set is two-level DCI, the TRP may send the quantity information of the to-be-sent control information to the UE in first-level DCI of the second transmission parameter set. In other words, the first-level DCI of the transmission parameter set may include the quantity information of the to-be-sent control information. When the quantity of pieces of to-be-sent control information is greater than or equal to 2, the first-level DCI of the second transmission parameter set may further include DCI content indication information that is equivalent to the foregoing content indication information of second transmission parameter sets.

The DCI content indication information indicates whether at least two pieces of to-be-sent control information are the same. The UE may correspondingly process the at least two pieces of control information based on the indication information. A processing manner is also the same as a processing manner described above. To be specific, if the DCI content indication information indicates that the at least two pieces of to-be-sent control information are the same, the UE may combine the detected at least two pieces of control information. In this way, a diversity gain can be obtained, and control information transmission reliability is improved. If the DCI content indication information indicates that the at least two pieces of to-be-sent control information are different, the UE may determine to separately obtain different data channels, to further transmit data. The first-level DCI of the second transmission parameter set may further include the foregoing QCL parameter indication information. In one embodiment, the first-level DCI of the second transmission parameter set may further include information indicating a rank for transmitting each quasi co-located codeword. In one embodiment, the first-level DCI of the second transmission parameter set may further include rank information. In one embodiment, the rank information may be information indicating a rank for transmitting each physical layer codeword, or may be rank information of data scheduled by using the control information. The first-level DCI of the second transmission parameter set further includes beam information. The beam information indicates a transmit beam of second-level DCI of the second transmission parameter set, or indicates a receive beam of the second-level DCI of the second transmission parameter set, or indicates a transmit beam and a receive beam of the second-level DCI of the second transmission parameter set. The control information may be sent by using the second-level DCI of the second transmission parameter set. Various other parameters described in the foregoing embodiment may also be sent in the first transmission parameter set or sent in the second transmission parameter set in the foregoing described manner. Content described in the foregoing embodiment may be applied to an implementation in which the first-level DCI of the transmission parameter set may include the quantity information of the to-be-sent control information.

Figure 3:
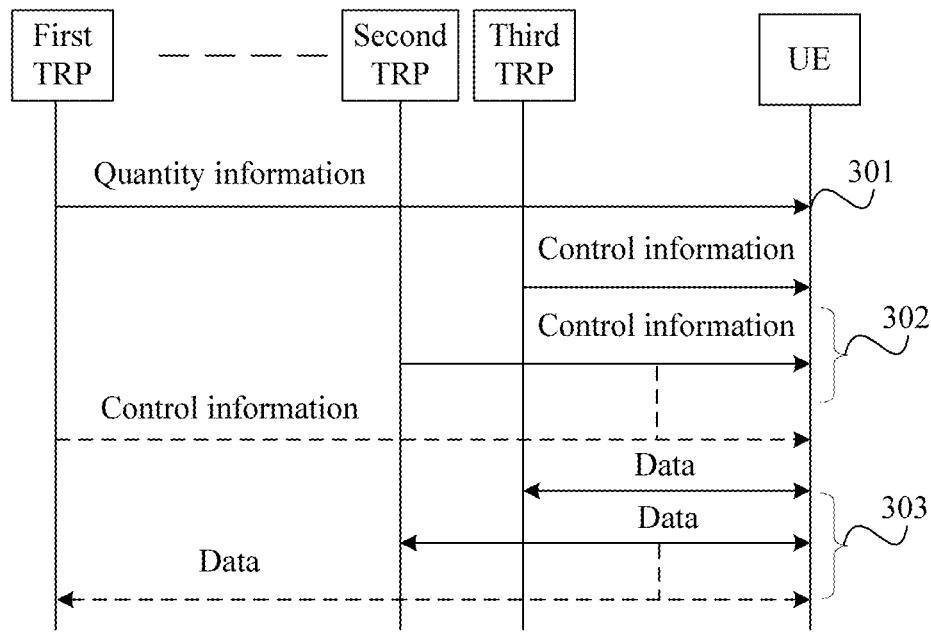
FIG. 3 is a schematic flowchart of a communication method according to an embodiment of the present disclosure.

With reference to the communications system shown in FIG. 2A and FIG. 2B and the content described in the foregoing embodiments, as shown in FIG. 3, an embodiment of the present disclosure provides a communication method, specifically, an information obtaining method. In the method, a TRP may send quantity information of to-be-sent control information to UE, where N pieces of control information are to be sent to the UE, and N is an integer greater than or equal to 1; the user equipment determines, based on the quantity information, that the N pieces of control information need to be detected; and the user equipment detects the control information from N TRPs. In operation 301, the TRP sends the quantity information of the to-be-sent control information to the UE, and the UE receives the quantity information of the to-be-sent control information.

In this embodiment, a first transmission parameter set may include the quantity information of the to-be-sent control information. The control information is sent by using a second transmission parameter set. To be specific, the TRP sends the first transmission parameter set to the UE. The first parameter set includes quantity information of the to-be-sent second transmission parameter set.

In an example shown in FIG. 3, a first TRP may send the first transmission parameter set. The first TRP may be the TRP 501 in the implementation of the communications system shown in FIG. 2A. Alternatively, the TRP 503, the TRP 505, or the TRP 507 in the implementation of the communications system shown in FIG. 2B sends the first transmission parameter set to the UE 404.

In this embodiment, the first transmission parameter set may include the quantity information of the to-be-sent second transmission parameter set and the information that is described in the foregoing embodiment and that may be included in the first transmission parameter set.

In this embodiment, quantity information of second transmission parameter sets transmitted on a same carrier is indicated to the UE. This not only can support multipoint transmission, but also can well implement backward compatibility with single connection transmission of the UE.

In this embodiment of the present disclosure, the first transmission parameter set may be sent to the UE in different manners.

In one embodiment, the first transmission parameter set may be sent by using a radio resource control (RRC) message. For example, the first transmission parameter set may be sent in an initial access process, a handover process, an RRC reconfiguration process, or the like of the UE by using the RRC message. The RRC message may further include an information element (IE) used to configure another radio resource. The radio resource may correspond to one or more of a physical downlink shared channel, a physical uplink shared channel, a physical uplink control channel, a channel state measurement-reference signal (CSI-RS), an uplink sounding reference signal (SRS), and the like.

The RRC message may alternatively carry only the first transmission parameter set. The first transmission parameter set is sent by using the RRC message, so that a control channel resource can be saved. In addition, the RRC message is carried by a PDSCH. Therefore, the first transmission parameter set can be sent by using a relatively low modulation order at a relatively low encoding rate, and transmission reliability is ensured.

In one embodiment, the first transmission parameter set may be sent by using a Medium Access Control (MAC) control element (CE). The MAC CE may carry some or all information in the first parameter set. The MAC CE carries related information used to indicate a PDCCH received by the UE. The first transmission parameter set is sent by using the MAC CE, so that a configuration of the PDCCH can be updated relatively quickly, and an actual physical channel can be better matched.

In one embodiment, the first transmission parameter set may be sent by using DCI in a complete format. For example, if a communications system in this embodiment of the present disclosure provides at least two pieces of DCI in a complete format, the first transmission parameter set may be sent in the DCI in a complete format.

In one embodiment, in this embodiment of the present disclosure, if multi-level DCI is provided, the first transmission parameter set may be sent by using first-level DCI. In this case, the second transmission parameter set may be sent by using second-level DCI.

In one embodiment, in operation 301, the quantity information of the to-be-sent control information may be sent by using first-level DCI of the second transmission parameter set. In other words, the first TRP sends the first-level DCI of the second transmission parameter set to the UE, and the first-level DCI includes the quantity information of the to-be-sent control information.

In operation 302, at least one TRP may send control information to the same UE.

In this embodiment, when the first transmission parameter set includes the quantity information of the to-be-sent control information, and the control information is sent by using the second transmission parameter set, the at least one TRP sends the second transmission parameter set to the same UE.

In this embodiment, the TRP sending the first transmission parameter set may be one of the at least one TRP sending the second transmission parameter set. In other words, the TRP sending the first transmission parameter set participates in sending the second transmission parameter set. Alternatively, the TRP sending the first transmission parameter set may not be one of the at least one TRP. In other words, the TRP sending the first transmission parameter set does not participate in sending the second transmission parameter set. For example, in operation 302, the first TRP may send a second transmission parameter set to the UE. In one embodiment, a first TRP may not send a second transmission parameter set to the UE.

The UE may determine, based on the quantity information, included in the first transmission parameter set, of the second transmission parameter set to be transmitted to the UE, a quantity of second transmission parameter sets that need to be received, and detect a corresponding determined quantity of second transmission parameter sets. If the UE determines that N second transmission parameter sets need to be received, the UE detects the N second transmission parameter sets, where N is an integer greater than or equal to 1.

In the multipoint transmission, the first transmission parameter set includes the quantity information of the second transmission parameter set to be transmitted to the UE, and the indicated quantity of to-be-transmitted second transmission parameter sets is at least 2. In this case, the UE determines that the quantity N of second transmission parameter sets that need to be received is an integer greater than or equal to 2. The TRP sends the quantity information of the to-be-transmitted second transmission parameter set to the UE. After obtaining the quantity information, the UE can determine the quantity of second transmission parameter set that needs to be detected, and the UE detects the corresponding quantity of second transmission parameter sets. In the coordinated multipoint transmission/reception, different TRPs can use second transmission parameter sets in a same format, there is no need to extend the second transmission parameter sets, and there is no need to frequently change the format of the second transmission parameter sets in different transmission either. Therefore, both the TRP and the UE can easily implement different transmission.

For example, the UE may blindly detect, based on the quantity of to-be-received second transmission parameter sets, a second transmission parameter on a candidate resource specified in resource information. If one second transmission parameter set needs to be received, the UE considers that the TRP sends only one second transmission parameter set in a scheduling unit, and performs blind detection on the candidate resource. If one second transmission parameter is detected, the UE considers that all second transmission parameter sets that need to be received are detected, and completes detection. If two second transmission parameter sets need to be received, the UE detects the two second transmission parameter sets on the candidate resource specified in the resource information. If two second transmission parameter sets are detected, the UE completes detection. If only one second transmission parameter set is detected after detection of the two second transmission parameter sets is completed and detection on all candidate resources is completed, the UE considers that only one second transmission parameter set is sent in a scheduling unit on a network side, and performs a next operation such as data receiving or sending based on control information indicated by the second transmission parameter set.

In a transmission mode shown in FIG. 2A, the UE 402 may receive the second transmission parameter set sent by the TRP 501. In a transmission mode shown in FIG. 2B, when the TRP sending the first transmission parameter participates in sending the second transmission parameter set, the UE 404 may receive second transmission parameter sets separately sent by the TRP 503, the TRP 505, and the TRP 507. When the TRP sending the first transmission parameter set does not participate in sending the second transmission parameter set, if the TRP 503 sends the first transmission parameter set, the UE 404 may receive second transmission parameter sets separately sent by the TRP 505 and the TRP 507.

In the coordinated multipoint transmission/reception provided in this embodiment of the present disclosure, at least two TRPs may separately send second transmission parameter sets to the same UE. The second transmission parameter sets separately sent by the at least two TRPs may have a same format. In other words, PDCCHs separately carrying the second transmission parameter sets have a same DCI format. The UE may detect the PDCCHs with the same DCI format. In the coordinated multipoint transmission/reception, the format of the second transmission parameter sets separately sent by the TRPs may also be the same as a format of a second transmission parameter set sent by a TRP in single point transmission.

In one embodiment, the second transmission parameter sets separately sent by the at least two TRPs to the same UE may have same content, or have different content. If the first transmission parameter set received by the UE includes content indication information of second transmission parameter sets, the UE determines, based on the indication information, whether the second transmission parameter sets have same content, to further perform corresponding processing. When the content indication information of second transmission parameter sets indicates that the second transmission parameter sets separately sent by the at least two TRPs to the same UE are the same, the UE may independently or jointly receive and combine the at least two second transmission parameter sets, to improve reliability of transmitting the second transmission parameter sets. When the content indication information of second transmission parameter sets indicates that the second transmission parameter sets sent by the at least two TRPs to the same UE are different, the UE independently demodulates each second transmission parameter set, combines no content, and performs data scheduling and transmission based on the second transmission parameter sets, including at least one of downlink data receiving and uplink data sending.

For example, the second transmission parameter sets sent by the at least two TRPs may have same content. When a link between one of the TRPs and the UE is interrupted or the one of the TRPs does not successfully send a second transmission parameter set on the link, the other TRPs may send a second transmission parameter set to the UE. Therefore, reliability of sending the second transmission parameter sets can be improved. Especially, for example, in a high frequency (HF) scenario, a TRP communicates with the UE by using a narrow beam, and high frequency communication has a relatively poor diffraction capability. In this case, obstruction is prone to occur. For example, in normal communication, a communication link is abruptly obstructed by a mobile object. When obstruction occurs, the communication link that operates normally is easily interrupted. Therefore, according to this embodiment of the present disclosure, reliability of sending the second transmission parameter sets can be improved.

Alternatively, for example, the second transmission parameter sets sent by the at least two TRPs may have different content. Therefore, according to the solution provided in this embodiment of the present disclosure, non-coherent joint transmission (NCJT) can be implemented. Each TRP may independently send a different second transmission parameter set to the same UE, and a corresponding second transmission parameter set indicates scheduling information of a corresponding TRP for the UE. Therefore, each TRP can independently perform data scheduling, and independently send data to the UE, thereby implementing the NCJT, and reducing a quantity of times of blind detection performed by the UE on a control channel.

In one embodiment, in the coordinated multipoint transmission/reception, the at least two TRPs may separately send the second transmission parameter sets to the same UE on a same carrier, or may separately send the second transmission parameter sets to the same UE on different carriers.

In one embodiment, in the coordinated multipoint transmission/reception, for DCI in a complete format that includes sublevel DCI, the second transmission parameter set is one piece of sublevel DCI, for example, second-level DCI. When the first transmission parameter set includes rank information, the UE may obtain layer information and port information for data transmission according to a codeword to layer mapping rule by using the received rank information. If the first transmission parameter set further includes QCL parameter configuration information corresponding to a codeword or QCL parameter configuration information corresponding to a control channel that carries the second transmission parameter set, the UE may perform channel estimation and demodulation on the control channel after receiving the QCL parameter configuration information.

In one embodiment, in operation 301, when the quantity information of the to-be-sent control information may be sent by using first-level DCI of the second transmission parameter set, the at least one TRP may send the control information by using second-level DCI of the second transmission parameter set. In other words, the second transmission parameter set includes the control information.

In one embodiment, after receiving the second transmission parameter set, the method may further include operation 303. In operation 303, the UE may further transmit data to the at least one TRP through a data channel indicated by the control information.

In the coordinated multipoint transmission/reception provided in this embodiment of the present disclosure, the at least two TRPs independently send the second transmission parameter sets or the control information, to independently schedule data transmission. When there are different carriers, data transmission between the different TRPs and the same UE may be performed on a same carrier or on different carriers. Data that is independently precoded may be the same, and therefore, data transmission reliability can be improved. Alternatively, data that is independently precoded may be different, and therefore, a data transmission capacity of an entire system can be improved. Therefore, according to the solution in this embodiment of the present disclosure, data transmission reliability can be improved, and a data transmission capacity of the system can be improved.

In this embodiment of the present disclosure, the quantity information of the to-be-transmitted control information or the quantity information of the to-be-transmitted second transmission parameter set may uniformly indicate a transmission mode, for example, may indicate a single point transmission mode or a multipoint transmission mode for distinguishing between the single point transmission mode and the multipoint transmission mode. In other words, different quantity information of the to-be-transmitted second transmission parameter set or different quantity information of the to-be-transmitted control information may indicate different transmission modes. In one embodiment, in this embodiment, the transmission mode and a channel-state-information measurement configuration parameter may be decoupled. The channel-state-information measurement configuration parameter includes a CSI-RS channel measurement configuration, a channel interference measurement configuration, a channel-state-information feedback mode configuration, a new state-information feedback period configuration, or the like. The single point transmission mode and the multipoint transmission mode may be indicated by the quantity information of the control information or the quantity information of the second transmission parameter set. The channel-state-information measurement configuration parameter is not bound and sent with information indicating the transmission mode, but is sent by using other higher layer signaling and/or physical layer signaling. In this way, channel-state-information measurement and feedback accuracy can be improved, communication can effectively adapt to an actual channel change, and communication efficiency is improved. For example, if the TRP may send the quantity information of the control information or the quantity information of the second transmission parameter set to the UE, and the quantity information is 1, the UE determines that a current transmission mode is non-coordinated transmission. The TRP may send the channel state information measurement configuration parameter to the UE based on the channel change, to instruct the UE to measure quality of a plurality of channels. If the plurality of channels meet multipoint transmission, coordinated transmission may be performed. The TRP may first send the quantity information of the second transmission parameter set or the quantity information of the control information in a form of DCI, a MAC CE, or hierarchical DCI. If the quantity information is greater than or equal to 2, the UE may immediately switch to a coordinated multipoint transmission/reception. Alternatively, the UE may quickly and dynamically switch from the coordinated multipoint transmission/reception to the non-coordinated transmission, so that communication can effectively adapt to the actual channel change, and communication efficiency is improved.

In this embodiment of the present disclosure, if QCL-related information in the first parameter set may be configured dynamically, and the first parameter set is configured non-dynamically, dynamic point selection (DPS) coordinated transmission may be further implemented. N TRPs may be selected as candidate TRP nodes, where N is an integer greater than or equal to 2. M TRPs are dynamically selected from the candidate TRPs to send data to same UE, where 1≤M≤N. In this embodiment, the quantity information of the second transmission parameter set or the quantity information of the control information that is sent by the TRP to the UE is N, and therefore, the UE detects N second transmission parameter sets or N pieces of control information on candidate resources. Because only M TRPs are selected to participate in coordinated transmission, the UE can detect only M second transmission parameter sets or M pieces of control information. In an effective period of the quantity information of the second transmission parameter set or the quantity information of the control information, the network side may dynamically select any quantity of TRPs from the N nodes to send the quantity information of the second transmission parameter set or the quantity information of the control information. There is no need to notify the UE of corresponding quantity information of the second transmission parameter set or corresponding quantity information of the control information each time TRPs participating in the coordinated transmission change, because the UE performs detection for a maximum of the N nodes. In this scenario, the network side does not need to frequently deliver higher layer signaling or physical layer signaling used to carry the first parameter set, and the UE does not need to perform frequent receiving. This not only saves an air interface resource, but also reduces UE energy consumption.

In this embodiment of the present disclosure, multi-TRP coordinated transmission of a plurality of second transmission parameter sets or a plurality of pieces of control information may be supported. Quantity information of the plurality of second parameter sets or quantity information of the plurality of pieces of control information may correspond to a plurality of PDCCHs or a plurality of pieces of DCI. Each piece of DCI or each PDCCH can be used to transmit scheduling information of a particular TRP. To support non-coherent joint transmission with non-ideal backhaul, different TRPs independently schedule a resource and send data, and each TRP independently sends a PDCCH. In this case, each piece of DCI carries resource scheduling information of a related TRP, and all DMRS ports corresponding to a data channel scheduled by using one piece of DCI may be considered to be quasi co-located. In comparison with single-TRP transmission, in the NCJT transmission, formats of all pieces of DCI are the same, and a difference lies in that the UE needs to detect at least two pieces of DCI or at least two PDCCHs from different TRPs. In addition, the plurality of second transmission parameter sets or the plurality of pieces of control information are supported, so that control channel reliability can be improved, and particularly, obstruction that occurs in a high frequency channel scenario is reduced. In this case, the different TRPs may transmit same control information to same target UE. A quantity of pieces of DCI that have the same control information may be configured in the first transmission parameter set. When the UE receives these pieces of DCI, the target UE may combine these pieces of DCI to obtain a diversity gain. Therefore, the first transmission parameter set may indicate physical layer control channels or control information sent by the different TRPs.

Most parameters in the first transmission parameter set can be semi-statically configured, and may be configured by using an RRC message. However, for the coordinated transmission, transmission periods of some parameter configurations in the first transmission parameter set may be several or even dozens of transmission time intervals (TTI). Therefore, related configuration may be performed by using a layer 1 or a layer 2. The some parameter configurations include a configuration of a quantity of second transmission parameter sets or a configuration of a quantity of pieces of control information, a configuration indicating whether the second transmission parameter sets have same content or whether the control information has same content, and the like that are described in the present disclosure.

The first transmission parameter set may be semi-statically configured. A transmission scheme set indication and a semi-static configuration/indication in the multipoint transmission each may have a signaling period that is long enough, and are applicable to a layer 3 design. Indications of a plurality of layer-1 control channels or a plurality of pieces of layer-1 control information from a plurality of different TRPs each have a signaling period that should be at least several TTIs and at most dozens of TTIs, and may be designed at the layer 1 or the layer 2. Therefore, the first transmission parameter set may support at least one of the layer-3 transmission scheme set indication, semi-static configuration/indications transmitted by the plurality of TRPs, and the layer-1 or layer-2 indications of the plurality of layer-1 control channels or the plurality of pieces of layer-1 control information from the plurality of different TRPs.

Figure 4A:
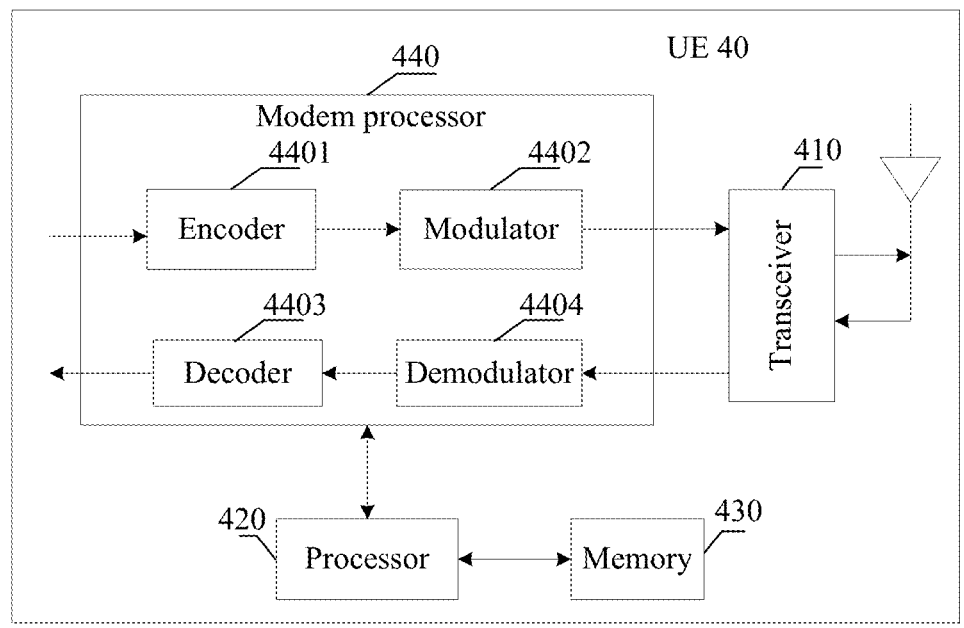
FIG. 4A is a schematic structural diagram of UE according to an embodiment of the present disclosure.
Figure 4B:
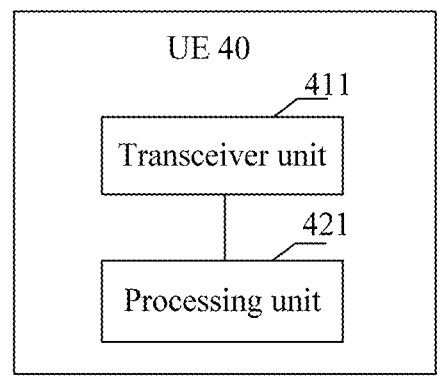
FIG. 4B is a schematic structural diagram of another UE according to an embodiment of the present disclosure.

FIG. 4A and FIG. 4B each are a schematic diagram of an embodiment of UE according to the present disclosure. UE 40 shown in the figure may be the UE 402 or the UE 404 in the embodiments shown in FIG. 2A, FIG. 2B, and FIG. 3. The UE 40 in the embodiments shown in FIG. 4A and FIG. 4B may be configured to implement content implemented by the UE 402 or the UE 404 in the embodiments shown in FIG. 2A, FIG. 2B, and FIG. 3, including all content of the first transmission parameter set and/or the second transmission parameter set described in all the foregoing embodiments.

The UE 40 shown in FIG. 4A includes a transceiver 410 and a processor 420, and may further include a memory 430 and a modem processor 440.

The transceiver 410 adjusts (for example, performs analog conversion, filtering, amplification, and up-conversion on) an output sample and generates an uplink signal. The uplink signal is transmitted to the TRP 50 in the foregoing embodiments through an antenna. On a downlink, the antenna receives a downlink signal transmitted by the TRP 50 in the foregoing embodiments. The transceiver 410 adjusts (for example, performs filtering, amplification, down-conversion, and digitization on) a signal received from the antenna and provides an input sample. For example, the transceiver 410 may receive quantity information, sent by a TRP, of to-be-sent control information, and may further receive control information sent by at least one TRP. Further, the transceiver 410 may receive downlink data sent by the at least one TRP, or send uplink data to the at least one TRP. In the modem processor 440, an encoder 4401 receives service data and a signaling message that are to be sent on an uplink, and processes (for example, formats, encodes, and interleaves) the service data and the signaling message. A modulator 4402 further processes (for example, performs symbol mapping and modulation on) encoded service data and an encoded signaling message, and provides an output sample. A demodulator 4404 processes (for example, demodulates) the input sample, and provides symbol estimation. A decoder 4403 processes (for example, de-interleaves and decodes) the symbol estimation, and provides decoded data and a decoded signaling message that are sent to the UE. The encoder 4401, the modulator 4402, the demodulator 4404, and the decoder 4403 may be implemented by the composite modem processor 440. These components perform processing according to a radio access technology used by a radio access network.

The processor 420 controls and manages an action of the UE 40, to perform processing performed by the UE 402 or the UE 404 in the foregoing embodiments. For example, the processor 420 may determine, based on the quantity information of the to-be-sent control information, a quantity of pieces of control information that need to be received, and detect a corresponding determined quantity of pieces of control information. The processor 402 is configured to support the UE 40 in implementing content of the UE in this embodiment of the present disclosure. The memory 430 is configured to store program code and data that are used by the UE 40.

As shown in FIG. 4B, an embodiment of the present disclosure provides another example of the UE 40. The UE 40 includes a transceiver unit 411 and a processing unit 421. The transceiver unit 411 may be configured to receive quantity information, sent by a TRP, of to-be-sent control information, may further receive control information sent by at least one TRP, and may further receive downlink data sent by the at least one TRP, or send uplink data to the at least one TRP. The processing unit 421 may be configured to: determine, based on the quantity information of the to-be-sent control information, a quantity of pieces of control information that need to be received, and detect a corresponding determined quantity of pieces of control information.

Figure 5A:
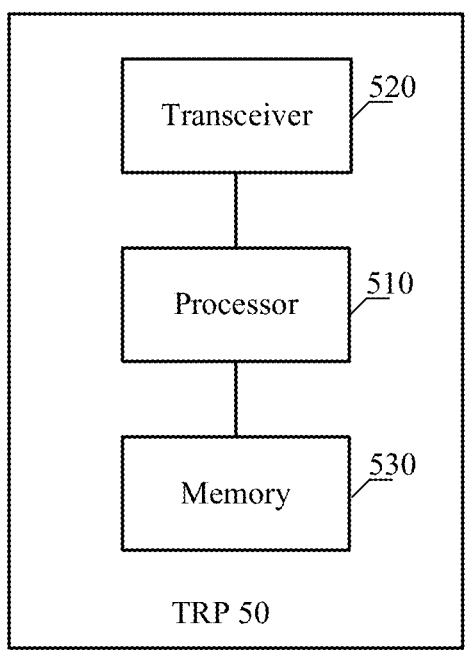
FIG. 5A is a schematic structural diagram of a TRP according to an embodiment of the present disclosure.
Figure 5B:
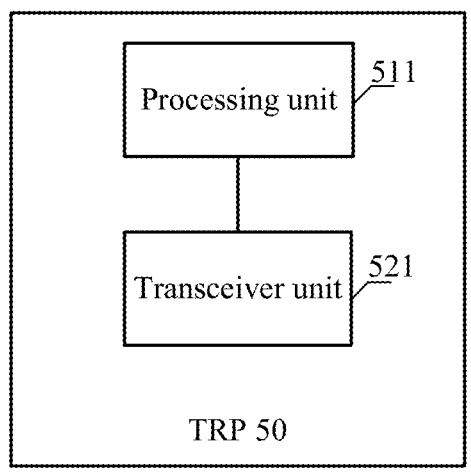
FIG. 5B is a schematic structural diagram of another TRP according to an embodiment of the present disclosure.

FIG. 5A and FIG. 5B each are a schematic structural diagram of a TRP 50 according to an embodiment of the present disclosure. The TRP 50 shown FIG. 5A and FIG. 5B may be the TRP, for example, the TRP 501, the TRP 503, or the TRP 505, in the embodiments shown in FIG. 2A, FIG. 2B, and FIG. 3. The TRP 50 in the embodiments shown in FIG. 5A and FIG. 5B may be configured to implement content implemented by the TRP in all the foregoing embodiments.

The TRP 50 shown in FIG. 5A includes a processor 510, a transceiver 520, and a memory 530. The transceiver 520 may be configured to support the TRP 50 in receiving or sending information from or to the UE 40 in the foregoing embodiment. For example, the processor 510 may determine quantity information of to-be-sent control information. The transceiver 520 may send the quantity information of the to-be-sent control information to UE, and send the control information to the UE. Further, the transceiver 520 may further send downlink data to the UE, and receive uplink data sent by the UE. The TRP 50 may further include the memory 530. The memory 530 may be configured to store program code and data of the TRP 50. It may be understood that FIG. 5A and FIG. 5B each merely show a simplified implementation of the TRP 50.

The TRP 50 shown in FIG. 5B includes a processing unit 511 and a transceiver unit 521. The processing unit 511 may be configured to determine quantity information of to-be-sent control information. The transceiver unit 521 may be configured to: send the quantity information of the to-be-sent control information to UE, and may send the control information to the UE. Further, the transceiver unit 521 may further send downlink data to the UE, and receive uplink data sent by the UE.

A person skilled in the art can understand that information and a signal may be indicated by using any technical method, for example, data, an instruction, a command, information, a signal, a bit, a symbol, and a chip may be indicated by using a voltage, a current, an electromagnetic wave, a magnetic field, a magnetic particle, a light field, an optical particle, or any combination thereof.

A person skilled in the art may further understand that various illustrative logical blocks and operations that are listed in the embodiments of the present disclosure may be implemented by using electronic hardware, computer software, or a combination thereof. To clearly display interchangeability between the hardware and the software, functions of the foregoing various illustrative components and operations have been generally described. Whether the functions are implemented by using hardware or software depends on particular applications and an implementation requirement of an entire system. A person skilled in the art may use various methods to implement the functions for each particular application, but it should not be understood that the implementation goes beyond the protection scope of the embodiments of the present disclosure.

The various illustrative logical blocks, modules, and circuits described in the embodiments of the present disclosure may be implemented by a general-purpose processor, a digital signal processor, an application-specific integrated circuit (ASIC), a field programmable gate array (FPGA) or another programmable logical apparatus, a discrete gate or transistor logic, a discrete hardware component, or any combination thereof, to implement or operate the described functions. The general-purpose processor may be a microprocessor. In one embodiment, the general-purpose processor may be any conventional processor, controller, microcontroller, or state machine. Alternatively, the processor may be implemented by a combination of computing apparatuses, such as a digital signal processor and a microprocessor, a plurality of microprocessors, one or more microprocessors and a digital signal processor core, or any other similar configuration.

Operations of the methods or algorithms described in the embodiments of the present disclosure may be directly embedded into hardware, a software module executed by a processor, or a combination thereof. The software module may be stored in a RAM memory, a flash memory, a ROM memory, an EPROM memory, an EEPROM memory, a register, a hard disk, a removable magnetic disk, a CD-ROM, or a storage medium of any other form in the art. For example, the storage medium may be connected to a processor, so that the processor may read information from the storage medium and write information into the storage medium. In one embodiment, the storage medium may be integrated into a processor. The processor and the storage medium may be disposed in an ASIC, and the ASIC may be disposed in a user terminal. In one embodiment, the processor and the storage medium may be disposed in different components of the user terminal.

In one or more example implementations, the foregoing functions described in the embodiments of the present disclosure may be implemented by hardware, software, firmware, or any combination thereof. If the functions are implemented by software, the functions may be stored in a computer readable medium or transmitted to the computer readable medium in a form of one or more instructions or code. The computer readable medium includes a computer storage medium or a communications medium that enables a computer program to move from one place to another. The storage medium may be an available medium that can be accessed by any general-purpose or special computer. For example, such a computer readable medium may include but is not limited to a RAM, a ROM, an EEPROM, a CD-ROM, another optical disc storage, another magnetic disk storage, or another magnetic storage apparatus, or any other medium that may be used to carry or store program code, where the program code is in a form of an instruction or a data structure or in a form that can be read by a general-purpose or special computer or a general-purpose or special processor. In addition, any connection may be appropriately defined as a computer readable medium. For example, if software is transmitted from a website, a server, or another remote resource by using a coaxial cable, an optical fiber, a twisted pair, a digital subscriber line (DSL), or in a wireless manner such as an infrared manner, a radio manner, or a microwave manner, the software is included in the defined computer readable medium. The disc/disk include a compressed disk, a laser disc, an optical disc, a DVD, a floppy disk, and a Blu-ray disc. The disk usually copies data by a magnetic means, and the disc usually copies data optically by a laser means. The foregoing combination may also be included in the computer readable medium.

A person skilled in the art may use or implement the content of the present disclosure based on the foregoing description of this specification in the present disclosure. Any modification based on the disclosed content shall be considered obvious in the art. The basic principles described in the present disclosure may be applied to other variations without departing from the essence and scope of the present disclosure. Therefore, the content disclosed in the present disclosure is not limited to the described embodiments and implementations, but may also be extended to a maximum scope that is consistent with the principles and disclosed new features of the present disclosure.

What is claimed is:

1. A communication method, comprising:
   receiving, by user equipment, quantity information, sent by a transmission reception point (TRP) of control information to be sent to the user equipment, wherein N pieces of control information are to be sent to the user equipment, wherein N is an integer greater than or equal to 1, and wherein N is less than or equal to a threshold determined based on overall system use;

determining, by the user equipment based on the quantity information, that the N pieces of control information need to be detected; and detecting, by the user equipment, the control information from N TRPs.

2. The method according to claim 1, wherein the quantity information of the control information to be sent to the user equipment is comprised in a first transmission parameter set, and the control information is comprised in a second transmission parameter set.

3. The method according to claim 2, wherein N is an integer greater than or equal to 2, the first transmission parameter set further comprises content indication information of second transmission parameter sets, and the content indication information of second transmission parameter sets indicates whether N second transmission parameter sets to be sent to the user equipment are the same.

4. The method according to claim 3, wherein the N second transmission parameter sets have same content; and
the method further comprises:
combining, by the user equipment, the detected N second transmission parameter sets.

5. The method according to claim 3, wherein the N second transmission parameter sets have different content; and
the method further comprises:
obtaining, by the user equipment, scheduling information of N data channels based on the N second transmission parameter sets detected from the N TRPs; and
separately transmitting, by the user equipment, data on the N data channels.

6. The method according to claim 1, wherein the quantity information of the control information to be sent to the user equipment is comprised in first-level downlink control information of a second transmission parameter set, and the control information is comprised in second-level downlink control information of the second transmission parameter set.

7. The method according to claim 6, wherein N is an integer greater than or equal to 2, the first-level downlink control information of the second transmission parameter set further comprises control information content indication information, and the control information content indication information indicates whether the N pieces of control information to be sent to the user equipment are the same.

8. The method according to claim 7, wherein the N pieces of control information have same content; and
the method further comprises:
combining, by the user equipment, the detected N pieces of control information.

9. The method according to claim 7, wherein the N pieces of control information have different content; and
the method further comprises:
obtaining, by the user equipment, scheduling information of N data channels based on the N pieces of control information detected from the N TRPs; and
separately transmitting, by the user equipment, data on the N data channels.

10. The method according to claim 1, wherein the N pieces of control information are used to schedule data transmission on a same carrier.

11. User equipment, comprising:
a transceiver, configured to receive quantity information, sent by a transmission reception point (TRP) of control information to be sent to the user equipment, wherein N pieces of control information are to be sent to the user equipment, wherein N is an integer greater than or equal to 1, and wherein N is less than or equal to a threshold determined based on overall system use; and
a processor, configured to: determine, based on the quantity information, that the N pieces of control information need to be detected, and detect the control information from N TRPs.

12. The user equipment according to claim 11, wherein the quantity information of the control information to be sent to the user equipment is comprised in a first transmission parameter set, and the control information is comprised in a second transmission parameter set.

13. The user equipment according to claim 12, wherein N is an integer greater than or equal to 2, the first transmission parameter set further comprises content indication information of second transmission parameter sets, and the content indication information of second transmission parameter sets indicates whether the second transmission parameter sets are the same.

14. The user equipment according to claim 13, wherein the N second transmission parameter sets have same content; and
the processor is further configured to combine the detected N second transmission parameter sets.

15. The user equipment according to claim 13, wherein the N second transmission parameter sets have different content;
the processor is further configured to obtain scheduling information of N data channels based on the detected N second transmission parameter sets; and
the transceiver is further configured to separately transmit data on the N data channels.

16. The user equipment according to claim 11, wherein the quantity information of the control information to be sent to the user equipment is comprised in first-level downlink control information of a second transmission parameter set, and the control information is comprised in second-level downlink control information of the second transmission parameter set.

17. The user equipment according to claim 16, wherein N is an integer greater than or equal to 2, the first-level downlink control information of the second transmission parameter set further comprises control information content indication information, and the control information content indication information indicates whether the N pieces of control information to be sent to the user equipment are the same.

18. The user equipment according to claim 17, wherein the N pieces of control information have same content; and
the processor is further configured to combine the detected N pieces of control information.

19. The user equipment according to claim 17, wherein the N pieces of control information have different content;
the processor is further configured to obtain scheduling information of N data channels based on the N pieces of control information detected from the N TRPs; and
the transceiver is further configured to separately transmit data on the N data channels.

20. The user equipment according to claim 11, wherein the N pieces of control information are used to schedule data transmission on a same carrier.

21. A non-transitory computer readable storage medium, comprising an instruction, wherein when the instruction runs on a computer, the computer performs:
receiving quantity information sent by a transmission reception point (TRP) of control information to be sent to the computer, wherein N pieces of control information are to be sent to the computer, wherein N is an integer greater than or equal to 1, and wherein N is less than or equal to a threshold determined based on overall system use;
determining based on the quantity information, that the N pieces of control information need to be detected; and
detecting the control information from N TRPs.

* * * * *